United States Patent
Weiser et al.

(10) Patent No.: US 6,180,746 B1
(45) Date of Patent: Jan. 30, 2001

(54) POLYIMIDE PRECURSOR SOLID RESIDUUM

(75) Inventors: Erik S. Weiser, Newport News; Terry L. St. Clair, Poquoson, both of VA (US); Yoshiaki Echigo; Hisayasu Kaneshiro, both of Kyoto (JP)

(73) Assignees: The United States of America as represented by the Administrator of the National Aeronautics and Space Administration, Washington, DC (US); Unitika, LTD (JP)

( * ) Notice: Under 35 U.S.C. 154(b), the term of this patent shall be extended for 0 days.

(21) Appl. No.: 09/316,428

(22) Filed: May 21, 1999

Related U.S. Application Data

(60) Provisional application No. 60/087,272, filed on May 29, 1998.

(51) Int. Cl.[7] .............................. C08G 73/10; C08G 69/26
(52) U.S. Cl. .......................... 528/170; 528/125; 528/128; 528/172; 528/173; 528/176; 528/183; 528/188; 528/220; 528/229; 528/350; 528/353
(58) Field of Search ..................................... 521/184, 155, 521/185; 528/170, 353, 125, 128, 176, 172–173, 183, 188, 220, 229, 350

(56) References Cited

U.S. PATENT DOCUMENTS

| | | | |
|---|---|---|---|
| 4,065,345 | 12/1977 | Progar et al. | 156/309 |
| 4,311,661 | 1/1982 | Palmer | 264/510 |
| 4,670,478 | 6/1987 | Shulman et al. | 521/88 |
| 4,816,493 * | 3/1989 | Indyke | 528/289 |
| 4,980,389 | 12/1990 | Hill et al. | 521/185 |
| 5,122,546 * | 6/1992 | Lee | 521/184 |
| 5,147,966 | 9/1992 | St. Clair et al. | 528/188 |

OTHER PUBLICATIONS

H. Tanaka et al, "Synthis of polyamic acids from trimellitic anhydride and bisphenols with diamines by a one–pot method", *Polyimides: Materials, Chemistry and Characterization*, Ed. C. Fagar et al. Elsevier Science Publishers, B.V. Amsterdam, 1989, pp. 267–277.

H. Tanaka et al., CAPLUS Abstract, "Synthesis of polyamic acids form trimellitic anhydride and bisphenols with diamines by a one–pot method", 1989, Meeting date 1988, 2 pages.

* cited by examiner

*Primary Examiner*—P. Hampton-Hightower
(74) *Attorney, Agent, or Firm*—Hillary W. Hawkins

(57) ABSTRACT

A polyimide precursor solid residuum is an admixture of an aromatic dianhydride or derivative thereof and an aromatic diamine or dervative thereof plus a complexing agent, which is complexed with the admixture by hydrogen bonding. The polyimide precursor solid residuum is effectively employed in the preparation of polyimide foam and the fabrication of polyimide foam structures.

14 Claims, 3 Drawing Sheets

ETHER

ETHER COMPLEX

POLYIMIDE PRECURSOR SOLID RESIDUUM

CROSS REFERENCE TO RELATED APPLICATION

This application claims the benefit of U.S. provisional application No. 60/087,272, filed May 29. 1998.

ORIGIN OF THE INVENTION

The invention described herein was jointly made by employees of the United States Government and employees of Unitka Ltd. In the performance of work under NASA MOA. SAA #385.

BACKGROUND OF THE INVENTION

1. Field of the Invention

The present invention relates generally to polyimides. It relates in particular to a polyimide precursor solid residuum, which is effectively employed in the preparation of polyimide foam and the fabrication of polyimide foam structures.

2. Description of the Related Art

High performance polyimides are presently used in the aerospace industry, for example, in joining metals to metals, or metals to composite structures. In addition, polyimides are rapidly finding new uses as foam insulation in cryogenic applications, and as structural foam having increased structural stiffness without large weight increases, in aerospace structures.

Polyimide foam materials have a number of beneficial attributes for next generation space vehicles, such as high temperature and solvent resistance, flame resistance, low smoke generation, high modulus and chemical and hot water resistance. Another area for polyimide foams is in the manufacture of low density insulation for thermal and acoustic applications, and reinforcement for the maritime industry.

U.S. Pat. Nos. 5,147,966 and 5,478,916 disclose polyimides that can be melt processed into various useful forms such as coatings, adhesives, composite matrix resins and films. These polyimides are prepared from various diamines and dianhydrides in various solvents. The use of monoanhydrides as endcapping agents is also disclosed in these patents to control the molecular weight of the polymers and, in turn, to make them easier to process in molten form. The use of ethers to make polyimide adhesives was disclosed in U.S. Pat. No. 4,065,345, which demonstrates another method to produce polyimide resin systems. FIG. 1 shows the method employed by these patents to produce polyimides.

U.S. Pat. No. 3,483,144 discloses a process for making polyimide foam by ball milling a mixture of monomers and heating the mixture to 300° C. In all cases, the foams produced by this patent are the result of dianhydricles or tetraacids being dissolved by a diamine upon melting. The ensuing reaction produces water and thus foams the molten material. FIG. 2 illustrates the process to make foam by this patent.

The state-of-the-art technology for making polyimide foams as disclosed in U.S. Pat. Nos. 5,298,531, 5,122,546, 5,077,318, and 4,900,761 utilizes solutions of diamines and dianhydride derivatives in a low molecular weight alkyl alcohol solvent. Polyimide precursor solutions and powders therefrom are then processed into foams through the expulsion of water and alcohol (R-OH) during the thermal imidization process. In these cases the alcohol solvent reacts initially with the dianhydride to form a covalently bonded specie referred to as a dialkylester-diacid (DADA) before the aromatic diamine is added. The aforementioned patents also illustrate the use of blowing agents to aid in the foaming process. The blowing agents utilized by these patents serve as a separate entity and usually result in a foam that has residual blowing agent within its cell walls. FIG. 3 demonstrates the state-of-the-art in this foam technology.

Howsoever useful, these related art processes for preparing foams from polyimide precursors are all found wanting, in that none provide foam densities over a wide range. Indeed, many commercially-available polyimide foams are made by employing an added step of densifying a low density foam to produce a foam of desired higher density. Moreover, in many of these related art processes undesirably high foaming temperatures are required, because the foaming agents are volatile by-products generated in the polycondensation reaction. Furthermore, many of these related art processes do not provide for uniformity in the blowing of the foam, and they result in non-uniformity of the foamed product. In particular, many of these foaming processes start out slowly, build tip to a maximum, and then taper off toward the end. The foamed products produced often exhibit non-uniformity of density and cell size throughout the foamed structure, which results in low yields of acceptable product. Additionally, some of the polyimide precursors employed in these related art processes (especially those involving isocyanate chemistry) have poor hydrolytic stability and poor stability toward other types of decomposition.

SUMMARY OF THE INVENTION

It is accordingly a primary object of the present invention to provide what is lacking in the related art. viz., a polyimide precursor solid residuum which has particular utility and special effectiveness in the preparation of polyimide foam and the fabrication of polyimide foam structures. It is another primary object of the present invention to provide a polyimide precursor solid residuum which possesses hydrolytic stability and storage stability toward other types of decomposition, and which affords a uniform foaming action, especially in respect of the length and intensity of the blowing process. It is another primary object of the present invention to provide a polyimide precursor solid residuum which affords the preparation of polyimide foams at moderate temperatures to effect foam products having a wide range of densities and a high degree of product uniformity, especially in respect of uniformity of density and cell size throughout the foamed structure. It is another primary object of the present invention to provide a polyimide precursor solid residuum which affords an efficient and efficacious foaming process, and which provides a polyimide foam having high temperature and solvent resistance, flame resistance, low smoke generation, high modulus, low density, and chemical and hot water resistance.

These objects and their attending benefits are achieved, and the disadvantages of the related art are avoided, by the present invention, which is a polyimide precursor solid residuum. This residuum is an admixture of an aromatic compound (A), which is an aromatic dianhydride or derivative thereof and aromatic compound (B), which is an aromatic diamine or derivative thereof, plus a complexing agent (C), which is complexed with the admixture by hydrogen bonding, the complexing agent (C) being present in an amount sufficient to provide from about 1 to about 15% by weight, based on the total weight of the polyimide precursor solid residuum.

Especially beneficial results are obtained if the polyimide precursor solid residuum according to the present invention is an admixture of an aromatic compound (A)

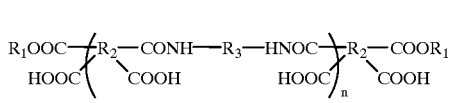

and an aromatic compound (B)

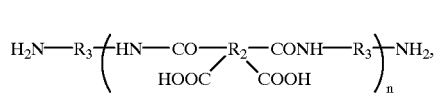

wherein n is an integer from 0 to 3, and $R_1$ is hydrogen or an alkyl group, and $R_2$ is a tetravalent aromatic radical having 1 to 5 benzenoid-unsaturated rings of 6 carbon atoms, $R_3$ is a divalent aromatic radical having 1 to 5 benzenoid-unsaturated rings of 6 carbon atoms, along with a complexing agent (C) being present in an amount sufficient to provide from about 1 to about 15% by weight, based on the total weight of the polyimide precursor solid residuum.

Outstanding results are obtained if the aromatic compound (A) and the aromatic compound (B) as specified above are present in the admixture in approximately equimolar amounts.

Especially good results are obtained if the coinplexing agent is an ether, especially one of, or a suitable mixture of tetrahydroftiran, glyme, diglyine, dioxane, 2-methoxy ethanol and 2-ethoxy ethanol.

The polyimide precursor solid residuum of the present invention advantageously has an apparent density of from about 1 to about 40 pounds/ft³, and is beneficial in the fonn of a powder, or friable balloons (as hereinafter described), or flake (as hereinafter described).

Very beneficial results are obtained if the aromatic compound (A) is at least one derivative of a dianhydride selected from ODPA; BPDA; BTDA; DSDA; PMDA and BPADA; and the aromatic compound (B) is at least one diamine which is selected from 3,4'ODA; 4,4'ODA; APB; BPB; m-PDA; p-PDA; 3,3'DDS; 4,4'DDS; 4,4 BAPS; 4,3 BAPS; 3 BAPB; 4 BAPB and BAPP.

Equally beneficial results are obtained if the polyimide precursor solid residuum is a combination of two or more different admixtures of aromatic compound (A) and aromatic compound (B) along with complexing agent (C), the aromatic compound (A) being at least one derivative of a dianhydride selected from ODPA; BPDA; BTDA; DSDA; PMDA and BPDA; and the aromatic compound (B) being at least one diamine which is selected from the group consisting of 3,4'ODA; 4,4'ODA; APB; BPB; m-PDA; p-PDA; 3,3'DDS; 4,4'DDS; 4.4 BAPS; 4.3 BAPS; 3 BAPB; 4 BAPB and BAPP.

The present invention also comprehends a process for producing the instant polyimide precursor solid residuum. This process includes the sequential steps of:

(a) dissolving an admixture of an aromatic comound (A), which is an aromatic dianhydride or dervative thereof, and an aromatic compound (B), which is an aromatic diamine or derivative thereof, in a solvent containing a complexing agent (C), which is capable of complexing with the admixture by hydrogen bonding, to form a solution having a solid content of at least 20% by weight, based on the total weight of the solution;

(b) condensing the solution by heating to effect a condensed solution having a solid content of up to about 85% by weight, based on the total weight of the condensed solution;

(c) cooling the condensed solution to effect solidification thereof;

(d) crushing the solidified condensed solution; and (e) heating the crushed solidified condensed solution at a temperature between about 70° C. and about 140° C. to fonn a polyimide precursor solid residuuin of an apparent density from about 1 to about 40 pounds/ft³ and a residual content of complexing agent (C) between about 1 and 15% by weight, based oil the total weight of the polyimide precursor solid residuum.

Especially beneficial results are obtained if aromatic compound (A) of the admixture is

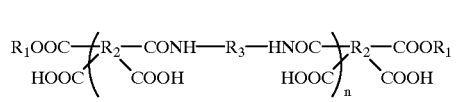

and an aromatic compound (B)

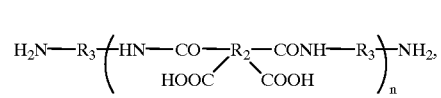

wherein n is an integer from 0 to 3, and $R_1$ is hydrogen or an alkyl group, and $R_2$ is a tetravalent aromatic radical having 1 to 5 benzenoid-unsaturated rings of 6 carbon atoms $R_3$ is a divalent aromatic radical having 1 to 5 benzenoid-unsaturated rings of 6 carbon atoms.

Outstanding results are obtained if the aromatic compound (B) as specified above are present in the admixture in approximately equimolar amounts.

Especially good results are obtained in the practice of this process if the complexing agent (C) is an ether, especially one of, or a suitable mixture of tetrahydrofuran, glyme, diglyme, dioxane, 2-metlhoxy ethanol and 2-ethoxy ethanol.

BRIEF DESCRIPTION OF THE DRAWINGS

For a more complete understanding of the present invention, including its primary objects and attending benefits, reference should be made to the Description of the Preferred Embodiments, which is set forth below. This Description should be read together with the accompanying Drawings, wherein.

DESCRIPTION OF THE PREFERRED EMBODIMENTS

Figure 1:
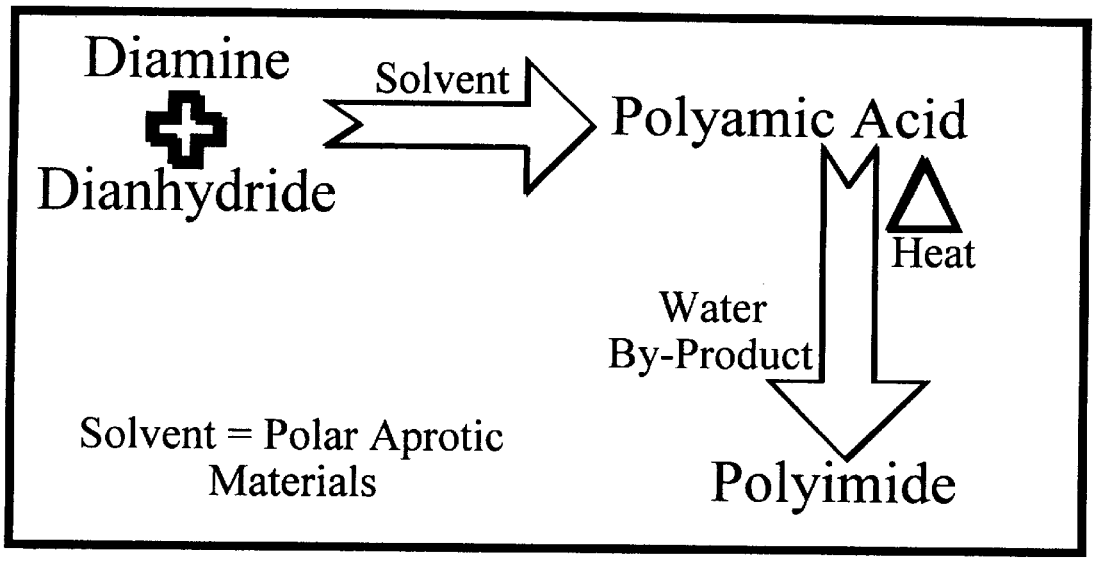
FIG. 1 is a process schematic representing a standard process for preparing polyimides.
Figure 2:
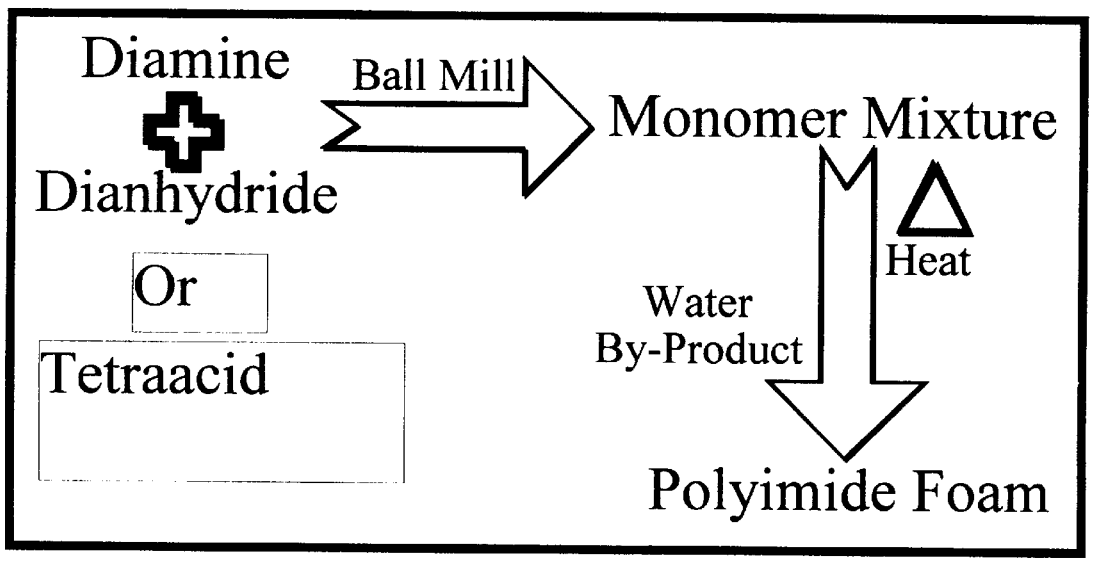
FIG. 2 is a process schematic representing the preparation of polyimide foam by ball milling.
Figure 3:
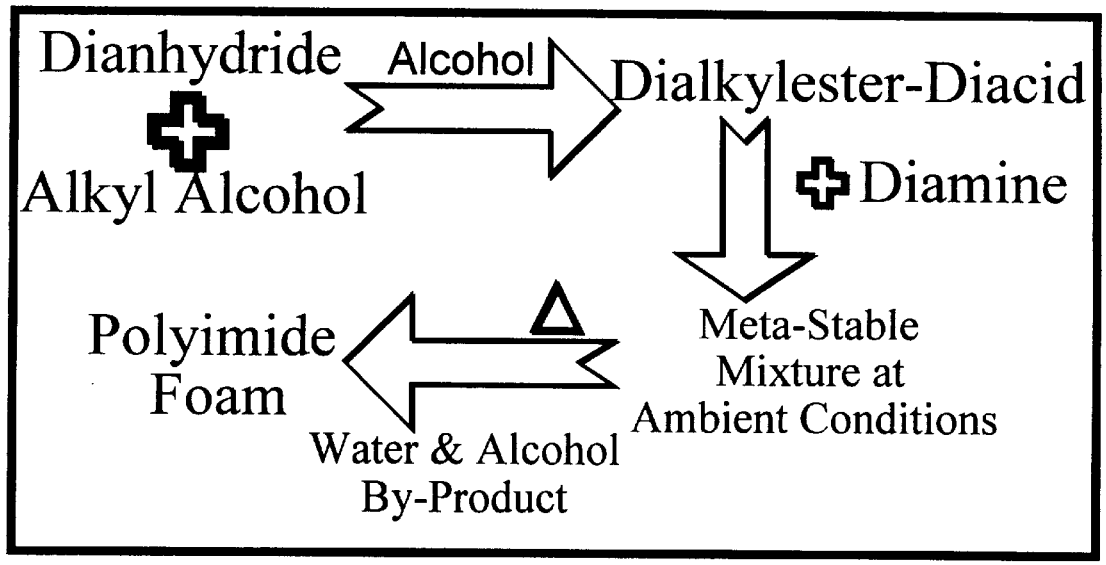
FIG. 3 is a process schematic representing a state-of-the-art process for making polyimide foams.
Figure 5:
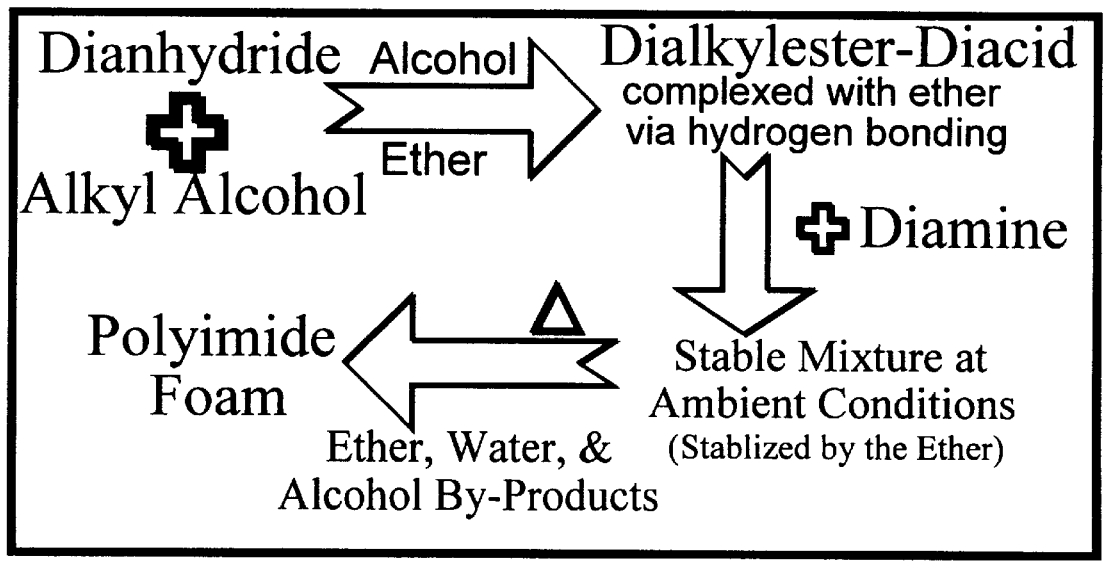
FIG. 5 is a process schematic representing a process for polyimide foam production using a polyimide precursor solid residuum according to the present invention.
Figure 4:
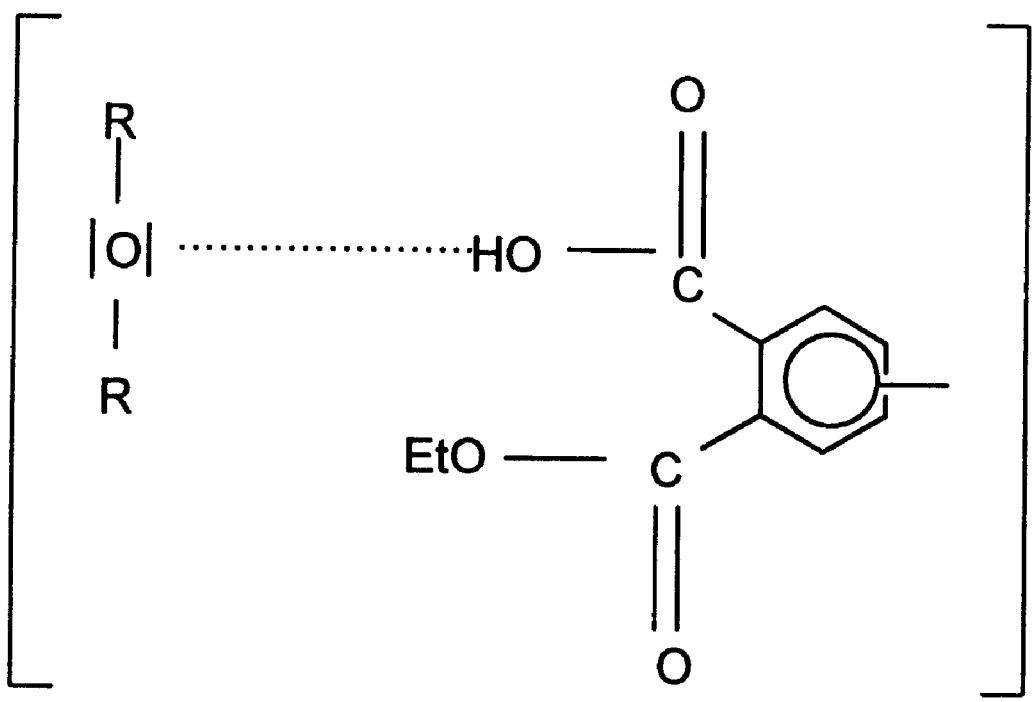
FIG. 4 is a representation of the formation of an ether complex, according to the present invention.

According to the present invention, a polyimide precursor solid residuum was fonned from the reaction of a dianhydride dispensed in a mixture of ethers and various alkyl alcohols at room temperature. See FIG. 4 for a representation of an ether stabilizing unit, according to the present invention. This suspension was treated at 70° C. for 6 hours in order to convert the dianhydride into a DADA complexed with ether by hydrogen bonding. This hydrogen bonding occurs between the ether oxygen and the acid protons. The resulting solution, DADA with hydrogen bonded ether was mixed with a diamine and stirred for 2 hours to yield a homogeneous polyimide precursor solution. (Likewise, similar polyimide foam precursors were formed from tetra-carboxylic acid forms (TA) of the dianhydrides and diamines mixed in various ethers and alkyl alcohols.) The solution was then charged into a stainless-steel vat and treated at 70° C. for 14 hours in order to evaporate excess solvents (ether and alkyl alcohol). The resulting material was allowed to cool and then crushed into a fine powder (~2 to ~200 μm). The powder was then heated to a temperature to allow foaming and imidization of the foam. The presence of the ether complex stabilizes the monomeric reactants and prevents chain growth and imidization until an optimum temperature and melt viscosity are reached for foaming. This temperature generally exceeds the temperature required for the onset of foaming used in the preparation of state-of-the-art foams. However, the hydrogen bonding that does occur between the ether and the DADA or TA/diamine salts causes the ether/blowing agent to be homogeneously distributed and thus an excellent and uniform cellular structure is obtained. FIG. 5 illustrates a foaming process employing a polyimide precursor solid residuum which is complexed with an ether according to the present invention.

The need to transform high temperature polyimides into high quality, low density foams is apparent. Foams of various densities, strengths, and thermal properties are now being required for future reusable launch vehicles, maritime ships, and commercial aeronautics applications. The present invention affords a technology capable of reproducible producing high quality foams of various chemical make-ups, densities, thermal properties, and strengths, by utilizing the effects of hydrogen bonding of an ether with a DADA in a mixture with diamines.

Technical terms used in the present application are now presented.
(1) Polyimide
The tern polyimide means a thermally-stable organic polymer wherein 60 to 100 mol %, preferably 70 mol % or more, more preferably 80 mol % or more, of the repeating units of the polymer chain thereof have the polyimide structure as represented, by the following formula (1):

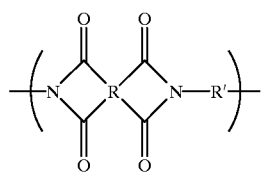

(I)

wherein R is a tetravalent aromatic radical having 1 to 5 benzenoid-unsaturated rings of 6 carbon atoms, the four carbonyl groups being directly bonded to different carbon atoms in a benzene ring of the R radical and each pair of carbonyl groups being bonded to adjacent carbon atoms in the benzene ring of the R radical, and R' is a divalent aromatic radical having 1 to 5 benzenoid-unsaturated rings of 6 carbon atoms, the amino groups being directly bonded to different carbon atoms in a benzene ring of the R' radical.

(2) Polyimide Precursor
The term Polyimide Precursor means an organic compound which becomes a polyimide by thermal imidization.
(3) Apparent density
Apparent density is estimated, for example, according to ASTM D-3574A.
(4) Compression strength
Compression strength is estimated, for example, according to ASTM D-3574C.
(5) Glass Transition temperature (Tg)
This thermal property is determined from the inflection point associated with a change in heat capacity at constant pressure employing Differential Scanning Calorimetry (DSC).
(6) An approximately equimolar mixture
A mixture of two components wherein the molar ratio is within the range of 0.95 to 1.05.
(7) The following abbreviations used herein are understood to mean:
ODPA=4,4'-oxydiphthalie anhydride
ODP-TA=4,4'-oxydiphthalic acid (a tetraacid)
BPDA=3,3',4,4'-biphenyl tetracarboxylic dianhydride
BTDA=3,3',4,4'-benzophenone tetracarboxylic dianhydride
DSDA=3,3',4,4'-diphenylsulfone tetracarboxylic dianhydride
PMDA=pyromellitic dianhydride
BPADA=2,2-bis(4-(3,4-carboxypllenyl)) propane dianhydride
3,4'ODA=3,4'-oxydianiline
4,4'ODA=4,4'-oxydianiline
APB=1,3-bis(3-aminophenoxy)benzene
BPB=1,3-bis(4-aminophenoxy)benzene
m-PDA=m-phenylenediamine
p-PDA=p-henylenediimine
3,3'DDS=3,3'-diaininodiphenylsulfone
4,4'DDS=4,4'-diaminodiphenylsulfone
4,4 BAPS=bis(4-(4-aninophenoxy)plenyl) sulfone
4,3 BAPS=bis(4-(3-aminophenoxy)plenyl) sulfone
3 BAPB=4,4'-bis(3-aminophenoxy)biphenyl
4 BAPB=4,4'-bis(4-aminophenoxy)biphenyl
BAPP=2,2-bis(4-(4-aminophenoxy)phenyl) propane
(8) Friable balloons is understood to mean a particular form of the polyimide precursor solid residuum according to the present invention, which has an apparent density of less than about 10 pounds/ft³ and which preferably has a substantially spherical shape.
(9) Flake means a blend of a polyimide precursor solid residuum according to the present invention with other polymers such as thermoplastic or thermosetting polymers. Thermoplastic polymers include thermoplastic polyimide and polyamide imide. Thermosetting polymers include epoxy. phenolic, and thermosetting polyimide. These other polymers are blended with the polyimide precursor solid residuum in any ratio to yield the flake.
(10) Examples of preferred polyimides comprehended herein include polyimides from ODPA/3,4'ODA (Formula 2) BPDA/3,4'ODA (Formula 3), BTDA/4,4'ODA (Formula 4), BTDA/4,4'DDS (Formula 5), BTDA/3,4'ODA (Formula 6), DSDA/BPB (Formula 7), BTDA/BPB (Formula 8), and BPDA/BPB (Formula 9).

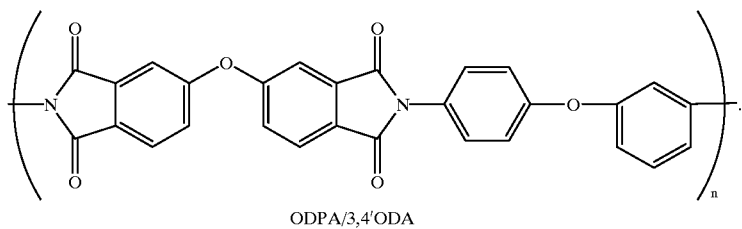
ODPA/3,4'ODA
Formula 2
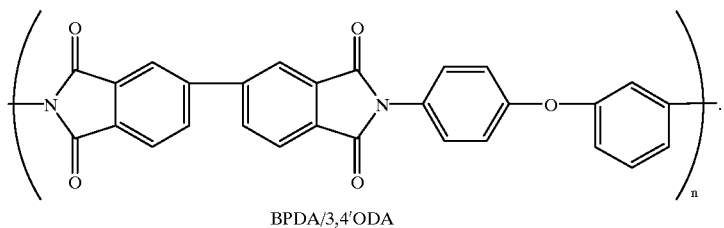
BPDA/3,4'ODA
Formula 3
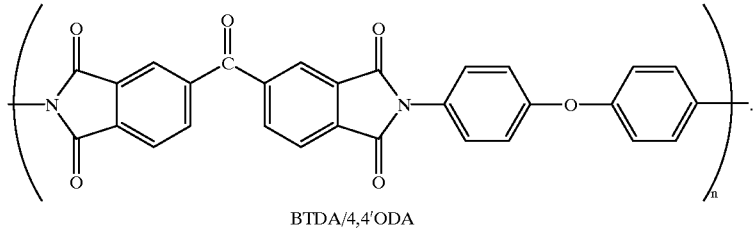
BTDA/4,4'ODA
Formula 4
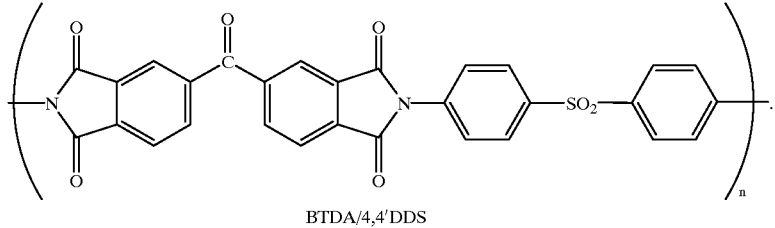
BTDA/4,4'DDS
Formula 5
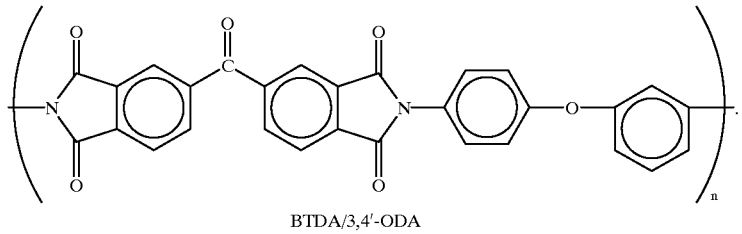
BTDA/3,4'-ODA
Formula 6
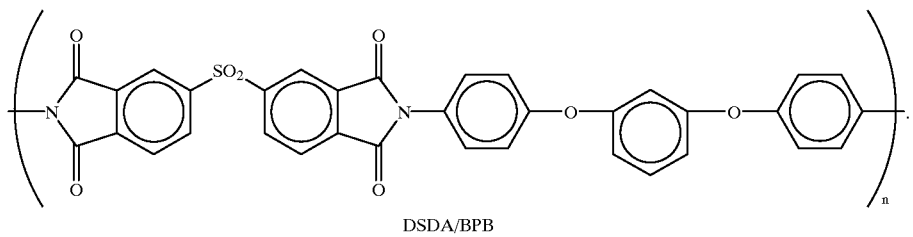
DSDA/BPB
Formula 7

-continued
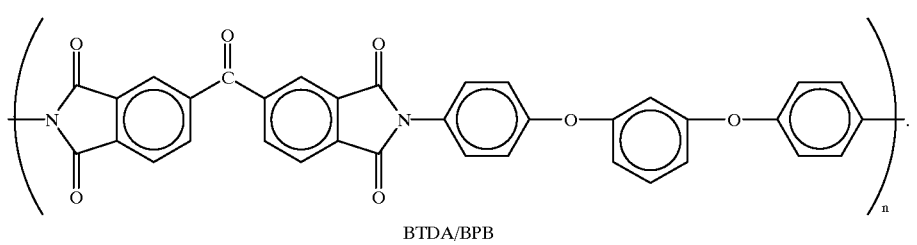
Formula 8
BTDA/BPB
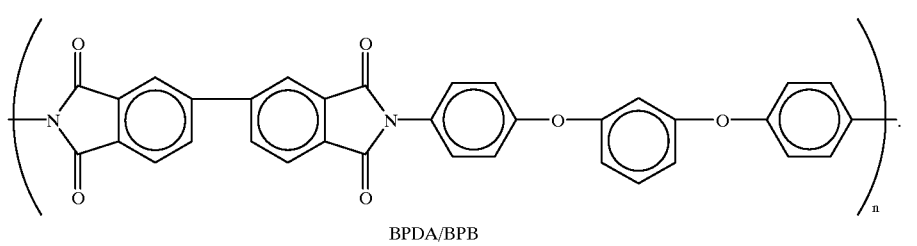
Formula 9
BPDA/BPB
(11) The polyimide comprehended in the present invention may be a copolyimide.
Examples of preferred copolyimides include polyimides of ODPA/3,4'ODA/PDA (90/10 molar ratio) (Formula 10), BPDA/3,4'ODA/APB (85/15 molar ratio) (Formula 11); BTDA/BPB/4,4'ODA (1/1 molar ratio) (Formula 12); and BTDA/PMDA (8/2 molar ratio)/4,4'ODA (Formula 13).

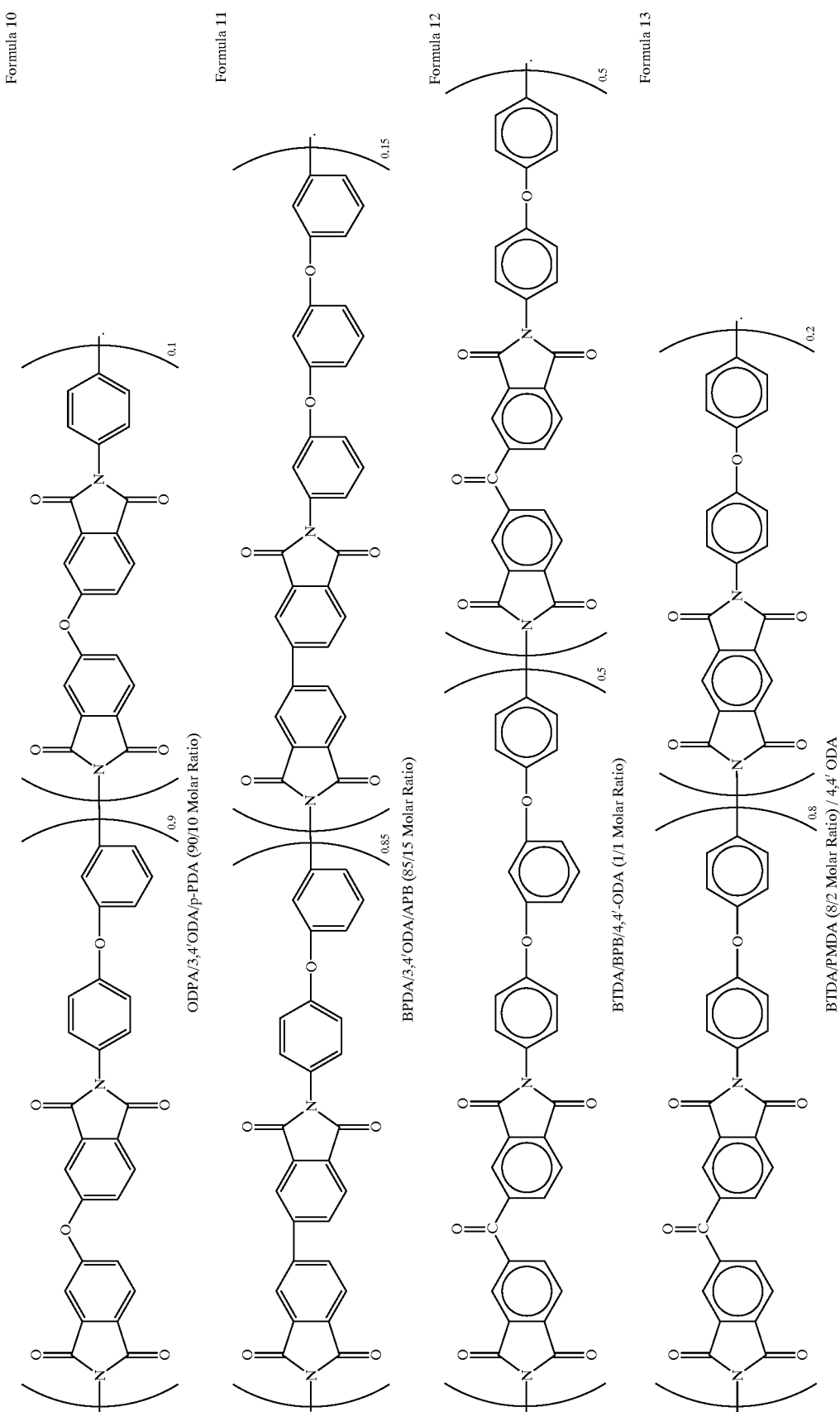

EXAMPLES

The following Examples are illustrative of the present invention and are not intended to limit its scope.

1. 756 g (2.4 mol) of ODPA was dispersed in a mixture of 480 g of THF and 280 g of MeOH at room temperature. This solution was treated at 70° C. for 6 hours in order to convert the ODPA into ODP-DADA complexed with THF by hydrogen bonding. 488 g (2.4 mol) of 3,4'ODA was added to the resulting solution of ODPA-DADA and stirred for 2 hours to yield a homogeneous polyimide precursor solution. The resulting polyimide precursor solution had a solids content of 70 wt % and a viscosity of 20 poise at 20° C. The solution was then charged into a stainless-steel vat and treated at 70° C. for 14 hours in order to evaporate off the solvent (THF and MeOH). The resulting material was allowed to cool and crushed into a fine powder (2 to 500 μm). (These powders are sieved using a mesh, if needed.) The polyimide precursor solid residuum was then treated for an additional amount of time (0 to 300 minutes) at 80° C. to further reduce the residual solvents to around 1–10 wt % depending on the final foam density desired. Residual amounts of THF were determined by measuring proton NMR spectra of the powders.
2. The procedure of Example 1 was repeated except that 480g of Glyme was used in replacement of THF.
3. The procedure of Example 1 was repeated except that 334g of EtOH was used in replacement of MeOH.
4. The procedure of Example 1 was repeated except that Dioxane was used in replacement of THF.
5. The procedure of Example 1 was repeated except that BTDA was used in replacement of ODPA.
6. The procedure of Example 1 was repeated except that BPDA was used in replacement of ODPA.
7. The procedure of Example 1 was repeated except that DSDA was used in replacement of ODPA.
8. The procedure of Example 1 was repeated except that PMDA and 3-BAPB was used, in replacement of ODPA and 3,4'ODA, respectively.
9. The procedure of Example 1 was repeated except that BPADA and m-PDA was used, in replacement of ODPA and 3,4'ODA, respectively.
10. The procedure of Example 1 was repeated except that a mixture of 3,4'ODA and p-PDA (mol ratio: 90/10) was used in replacement of 3,4'ODA.
11. The procedure of Example 5 was repeated except that 4,4'ODA was used in replacement of 3,4'ODA.
12. The procedure of Example 2 was repeated except that 4,4'DDS and BTDA were used in replacement of 3,4'ODA and ODPA, respectively.
13. The procedure of Example 5 was repeated except that 4,3BAPS was used in replacement of 3,4'ODA.
14. The procedure of Example 6 was repeated except that a mixture of 3,4'ODA and APB (mol ratio: 85/15) was used in replacement of 3,4'ODA.
15. 227g (1.1 mol) of 3,4'ODA was dissolved in a mixture of 1120 g of THF and 280 g of MeOH at room temperature. To the stirring 3,4'ODA solution, 176 g (0.57 mol) of ODPA was added gradually at 15° C. over 40 min. The resulting mixture was stirred for 2 hr at 15° C. to yield a homogeneous solution. To this solution, 197 g (0.57 mol) of ODPA-TA (tetra-acid form of ODPA) was added gradually and the mixture was stirred for 24 hr at 30° C. to yield a homogenous precursor solution. Solid contents and viscosity of the resulting solution were 30 wt % and 0.2 poise, respectively. From this solution, polyimide precursor solid residuum was prepared in a similar manner to Example 1.
16. 336g (0.78 mol) of 4,4 BAPS was dissolved in a mixture of 1120 g of THF and 280 g of MeOH at room temperature. To the stirring BAPS solution, 125 g (0.39 mol) of BTDA was added gradually at 15° C. over 40 min. The resulting mixture was stirred for 2 hr at 15° C. to yield a homogeneous solution. To this solution, 139 g (0.39 mol) of BTDA-TA (tetra-acid form of BTDA) was added gradually and the mixture was stirred for 24 hr at 30° C. to yield a homogenous precursor solution. Solid content and viscosity of the resulting solution were 30 wt % and 0.2 poise, respectively. From this solution, polyimide precursor solid residuum was prepared in a manner similar to Example 1.
17. The procedure of Example 16 was repeated except that 4, 3BAPS was used in replacement of 4,4 BAPS.
18. The procedure of Example 16 was repeated except that BAPP was used in replacement of 4,4 BAPS.
19. The procedure of Example 16 was repeated except that a mixture of 4,4'DDS and 3,3'DDS (mol ratio: 50/50) was used in replacement of 4,4 BAPS.
20. The procedure of Example 16 was repeated except that a mixture of 4,4'DDS and 3,3'DDS (mol ratio: 80/20) was used in replacement of 4,4 BAPS.
21. The procedure of Example 15 was repeated except that a mixture of 3,4'ODA and APB (mol ratio: 85/15) and BPDA were used in replacement of 3,4'ODA and ODPA, respectively.
22. The procedure of Example 16 was repeated except that 4,4'DDS was used in replacement of 4,4 BAPS.
23. Polyimide precursor solid residua obtained by the procedure of the Example 15 were further treated at 100° C. to expand them without thermal imidization so that their apparent densities were decreased without thermal imidization.
24. Polyimide precursor solid residua obtained by the procedure of the Example 16 were further treated at 140° C. to expand them without thermal imidization so that their apparent densities were decreased without thermal imidization.
25. Polyimide precursor solid residua obtained by the procedure of the Example 17 were further treated at 120° C. to expand them without thermal imidization so that their apparent densities were decreased without thermal imidization.
26. Polyimide precursor solid residua obtained by the procedure of the Example 18 were further treated at 120° C. to expand them without thermal imidization so that their apparent densities were decreased without thermal imidization.
27. Polyimide precursor solid residua obtained by the procedure of the Example 19 were further treated at 110° C. to expand them without thermal imidization so that their apparent densities were decreased without thermal imidization.
28. Polyimide precursor solid residua obtained by the procedure of the Example 20 were further treated at 110° C. to expand them without thermal imidization so that their apparent densities were decreased without thermal imidization.
29. Polyimide precursor solid residua obtained the by procedure of the Example 21 were further treated at 130° C. to expand them without thermal imidization so that their apparent densities were decreased without thermal imidization.
30. Polyimide precursor solid residua obtained by the procedure of the Example 11 were further treated at 100° C. to expand them without thermal imidization so that their apparent densities were decreased without thermal imidization.

31. Polyimide precursor solid residua obtained by the procedure of the Example 22 were further treated at 110° C. to expand them without thermal imidization so that their apparent densities were decreased without thermal imidization.
32. The procedure of Example 15 was repeated except that ODPA Dimethyl ester was used in replacement of ODPA-TA.
33. Polyimide precursor solid residua obtained by the procedure of the Example 32 were further treated at 100° C. to expand them without thermal imidization so that their apparent densities were decreased without thermal imidization.
34. The procedure of Example 1 was repeated, except that a mixture of BTDA and NA(5-norbornene-2,3-dicarboxylic anhydride) (mol ratio: 2.1/2.0) was used in replacement of ODPA (mol ratio of BTDA/3,4'ODA is 0.68).
35. Polyimide precursor solid residua prepared by the process of the above examples were expanded to form foam as follows: 0.5 g of polyimide precursor solid residuum was charged into a standard glass tube (diameter 16 mm/length 180 mm). The glass tube was placed in a circulating air oven set to 140° C., and the material was held upto 15 minutes at this temperature. The hold at 140° C. allowed foaming to occur. Once the hold was completed the test tube was returned to ambient conditions and the height of the resulting foam was measured.

In Table 1, values of the foam height are summarized, as well as properties of the polyimide precursor powder of these examples.

Comparative Examples

The following examples, which do not exemplify the polyimide precursor solid residuum of the present invention, are set forth for comparative purposes, as they are characteristic of the related art.

1. Into a reaction flask fitted with a mechanical stirrer were charged 20.4 g (0.057 mol) of BTDA-TA, 11.8 g (0.057 mol) of 4,4'ODA, and 75 g of THF. Stirring was begun and continued for 24 hours at ambient temperature. Thereafter, the resulting slurry (Solid contents: 30 wt %) was charged into a stainless-steel vat and air-dried at ambient temperature for 6 hours in order to drive off an excess amount of THF. As a result, dried powders, which showed no-tackiness, were obtained. THF content of the resulting powder was 1.9 wt %. This powder did not foam when the expandability was measured according to Example 35 above.
2. The procedure of Comparative Example 1 was repeated except that m-PDA (0.057 mol) and dioxane were used in replacement of 4,4'ODA and THF, respectively. Dried powders, which showed no-tackiness, were obtained as in the case of Comparative Example 1. Dioxane content of the resulting powder was 1.6 wt %. This powder did not foam as was the case in comparative example 1.
3. 19.7 g (0.057 mol) of ODPA-TA and 11.8 g (0.057 mol) of 3,4'ODA were dissolved into 46.0 g and 27.5 g of MeOH, respectively. The resulting two uniform solutions (30 wt %—solids each) were added together and mixed under mechanical stirring at ambient temperature. During stirring for 10 min. the solution changed to a heterogeneous suspension. The stirring was continued for 24 hours at ambient temperature. Thereafter, the resulting slurry (solid contents: 30 wt %) was filtered to produce a wet cake. The obtained wet cake was dried for 2 hours at 60° C. to produce quantitatively a salt-like powder consisting of equimolar amounts of ODPA-TA and 3,4'ODA and no residual MeOH. This was confirmed by NMR measurements. 8 g of the powder was wetted by 2 g of THF, and the resulting mixture was air-dried for 2 hours. THF content of the resulting powder was 2.5 wt %. This powder did not foam when the expandability was measured according to Example 35 above.

TABLE 1

Properties of Polyimide Precursor Solid Residuum

| Example | PI | Precursor Powder No. | Ether contents (wt %) | Average Particle size (m) | Apparent Density (pcf) | Expandability (mm) |
|---|---|---|---|---|---|---|
| 1 | ODPA/3,4'ODA | (A) | 2.7 | 155 | 43 | 32 |
|  |  | (B) | 3.5 | 400 | 37 | 60 |
|  |  | (C) | 3.2 | 300 | 37 | 55 |
|  |  | (D) | 2.8 | 200 | 42 | 45 |
|  |  | (E) | 1.9 | 100 | 36 | 17 |
| 2 | ODPA/3,4'ODA | (F) | 6.1 | 140 | 41 | 83 |
| 3 | ODPA/3,4'ODA | (G) | 4.1 | 130 | 38 | 85 |
| 4 | ODPA/3,4'ODA | (H) | 5.8 | 140 | 40 | 82 |
| 5 | BTDA/3,4'ODA | (I) | 4.2 | 150 | 37 | 82 |
| 6 | BPDA/3,4'ODA | (J) | 3.9 | 140 | 39 | 80 |
| 7 | DSDA/3,4'ODA | (K) | 4.0 | 160 | 40 | 85 |
| 8 | PMDA/3BAPB | (L) | 3.8 | 150 | 40 | 82 |
| 9 | BPADA/m-PDA | (M) | 4.0 | 150 | 41 | 84 |
| 10 | ODPA/3,4'ODA,p-PDA(9/1) | (N) | 3.3 | 120 | 36 | 81 |
| 11 | BTDA/4,4'ODA | (O) | 4.0 | 80 | 26 | 95 |
|  |  | (P) | 4.3 | 300 | 30 | 105 |
|  |  | (Q) | 4.1 | 200 | 31 | 91 |
|  |  | (R) | 3.9 | 100 | 27 | 80 |
|  |  | (S) | 3.7 | 50 | 26 | 40 |
|  |  | (T) | 3.2 | 50 | 25 | 20 |
| 12 | BTDA/4,4'DDS | (U) | 6.4 | 150 | 48 | 84 |
|  |  | (V) | 6.7 | 150 | 49 | 100 |
| 13 | BTDA/4,3BAPS | (W) | 4.6 | 150 | 41 | 81 |

TABLE 1-continued

Properties of Polyimide Precursor Solid Residuum

| Example | PI | Precursor Powder No. | Ether contents (wt %) | Average Particle size (m) | Apparent Density (pcf) | Expandability (mm) |
|---|---|---|---|---|---|---|
| 14 | BPDA/3,4'ODA,APB (85/15) | (X) | 4.3 | 140 | 36 | 35 |
| 14 | BPDA/3,4'ODA,APB (85/15) | (Y) | 4.7 | 140 | 37 | 70 |
| 15 | ODPA/3,4'ODA | (Z) | 13.5 | 400 | 29 | 140 |
|  |  | (AA) | 12.0 | 200 | 31 | 120 |
|  |  | (BB) | 10.2 | 200 | 30 | 70 |
| 16 | BTDA/4,4'BAPS | (CC) | 12.3 | 150 | 22 | 100 |
| 17 | BTDA/4,3BAPS | (DD) | 11.5 | 150 | 25 | 110 |
| 18 | BTDA/BAPP | (EE) | 12.1 | 150 | 29 | 105 |
| 19 | BTDA/4,4'DDS, 3,3' DDS(5/5) | (FF) | 10.2 | 150 | 31 | 95 |
| 20 | BTDA/4,4'DDS, 3,3'DDS(8/2) | (GG) | 10.5 | 150 | 29 | 100 |
| 21 | BPDA/3,4'ODA,APB (85/15) | (HH) | 12.0 | 140 | 31 | 120 |
| 22 | BTDA/4,4'DDS | (II) | 14.8 | 150 | 33 | 110 |
| 23 | ODPA/3,4'ODA | (JJ) | 11.2 | 1000 | 2.4 | 125 |
|  |  | (KK) | 10.7 | 300 | 3.7 | 90 |
|  |  | (LL) | 7.0 | 300 | 2.4 | 74 |
| 24 | BTDA/4,4'BAPS | (MM) | 9.1 | 400 | 3.7 | 45 |
| 25 | BTDA/4,3BAPS | (NN) | 8.6 | 400 | 2.5 | 80 |
| 26 | BTDA/BAPP | (OO) | 9.0 | 400 | 3.1 | 60 |
| 27 | BTDA/4,4'DDS, 3,3'DDS(5/5) | (PP) | 7.2 | 400 | 2.1 | 90 |
| 28 | BTDA/4,4'DDS, 3,3'DDS(8/2) | (QQ) | 7.9 | 400 | 2.6 | 70 |
| 29 | BPDA/3,4'ODA,APB (85/15) | (RR) | 9.8 | 300 | 3.9 | 40 |
| 30 | BTDA/4,4ODA | (SS) | 3.1 | 800 | 3.4 | 55 |
|  |  | (TT) | 2.5 | 300 | 3.0 | 70 |
| 31 | BTDA/4,4'DDS | (UU) | 9.1 | 400 | 3.2 | 60 |
| 32 | ODPA/3,4'ODA | (VV) | 10.3 | 150 | 36 | 130 |
| 33 | ODPA(3,4'ODA | (WW) | 8.5 | 500 | 4.1 | 48 |
| 34 | BTDA,NA (2.1/2.0)/3,4'ODA | (XX) | 3.9 | 150 | 34 | 50 |

We claim:

1. A polyimide precursor solid residuum comprising an admixture of an aromatic compound (A), which is an aromatic dianhydride or a derivative of an aromatic dianhydride, and an aromatic compound (B), which is an aromatic diamine or a derivative of an aromatic diamine, plus a complexing agent (C), which is an ether, the complexing agent (C) being present in an amount sufficient to provide from about 1 to about 15% by weight, based on the total weight of the polyimide precursor solid residuum.

2. A polyimide precursor solid residuum comprising an admixture of an aromatic compound (A)

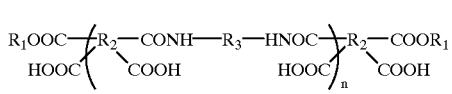

[A]

and an aromatic compound (B)

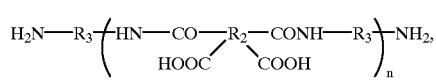

(B)

wherein n is an integer from 0 to 3, and $R_1$ is hydrogen or an alkyl group, and $R_2$ is a tetravalent aromatic radical having 1 to 5 benzenoid-unsaturated rings of 6 carbon atoms, $R_3$ is a divalent aromatic radical having 1 to 5 benzenoid-unsaturated rings of 6 carbon atoms;

plus a complexing agent (C), which is an ether, the complexing agent being present in an amount sufficient to provide from about 1 to about 15% by weight, based on the total weight of the polyimide precursor solid residuum.

3. A polyimide precursor solid residuum comprising an approximately equimolar admixture of an aromatic compound (A)

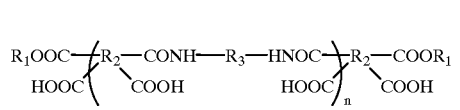

[A]

and an aromatic compound (B)

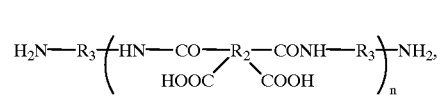

(B)

wherein n is an integer from 0 to 3, and $R_1$ is hydrogen or an alkyl group, and $R_2$ is a tetravalent aromatic radical having 1 to 5 benzenoid-unsaturated rings of 6 carbon atoms, $R_3$ is a divalent aromatic radical having 1 to 5 benzenoid-unsaturated rings of 6 carbon atoms;

plus a complexing agent (C), which is an ether, the complexing agent being present in an amount sufficient to provide from about 1 to about 15% by weight, based on the total weight of the polyimide precursor solid residuum.

4. A polyimide precursor solid residuum according to claim 3, wherein the ether is selected from the group consisting of tetrahydrofuran, glyme, diglyme, dioxane, 2-methoxy ethanol and 2-ethoxy ethanol.

5. A polyimide precursor solid residuum according to claim 3, wherein the aromatic compound (A) is at least one derivative of a dianhydride selected from the group consisting of ODPA; BPDA; BTDA; DSDA; PMDA and BPADA; and the aromatic compound (B) is at least one dervative of a diamine which is a member selected from the group consisting of 3,4' ODA; 4,4' ODA; APB; BPB; m-PDA; p-PDA; 3,3' DDS; 4,4' DDS; 4,4 BAPS; 4,3 BAPS; 3 BAPB; 4 BAPB and BAPP.

6. A polyimide precursor solid residum according to claim 3, which is a combination of two or more different admixtures of aromatic compound (A) and aromatic compound (B) along with complexing agent (C), the aromatic compound (A) being at least one derivative of a dianhydride selected from the group consisting of ODPA; BPDA; BTDA; DSDA; PMDA and BPDA; and the aromatic compound (B) being at least one dervative of a diamine which is a member selected from the group consisting of 3,4' ODA; 4,4' ODA; APB; BPB; m-PDA; p-PDA; 3,3' DDS; 4,4' DDS; 4,4 BAPS; 4,3 BAPS; 3 BAPB; 4 BAPB and BAPP.

7. A polyimide precursor solid residuum according to claim 3, which has a density of from about 1 to about 40 pounds/ft$^3$.

8. A process for producing the polyimide precursor solid residuum of claim 1, which process comprises:

(a) dissolving an admixture of an aromatic compound (A), which is an aromatic dianhydride or dervative thereof, and an aromatic compound (B), which is an aromatic diamine or derivative thereof, in a solvent containing a complexing agent (C), which is complexed with the admixture by hydrogen bonding, to form a solution having a solid content of at least 20% by weight, based on the total weight of the solution;

(b) condensing the solution by heating to effect a condensed solution having a solid content of up to about 85% by weight, based on the total weight of the condensed solution;

(c) cooling the condensed solution to effect solidification thereof;

(d) crushing the solidified condensed solution; and (e) heating the crushed solidified condensed solution at a temperature between about 70° C. and about 140° C. to form a polyimide precursor solid residuum of an apparent density from about 1 to about 40 pounds/ft$^3$ and a residual content of complexing agent (C) between about 1 and 15% by weight, based on the total weight of the polyimide precursor solid residuum.

9. The process of claim 8, wherein the aromatic compound (A) is

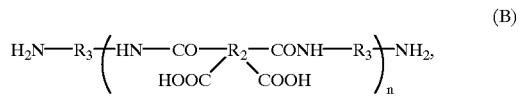

[A]

and the aromatic compound (B) is

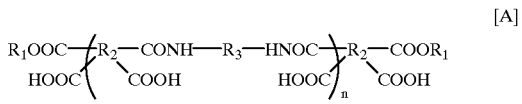

[B]

wherein n is an integer from 0 to 3, and $R_1$ is hydrogen or an alkyl group, and $R_2$ is a tetravalent aromatic radical having 1 to 5 benzenoid-unsaturated rings of 6 carbon atoms, $R_3$ is a divalent aromatic radical having 1 to 5 benzenoid-unsaturated rings of 6 carbon atoms.

10. A process for producing a polyimide precursor solid residuum of claim 3, which process comprises:

(a) dissolving an approximately equimolar admixture of an aromatic compound (A)

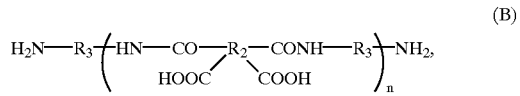

[A]

and an aromatic compound (B)

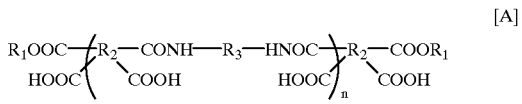

[B]

wherein n is an integer from 0 to 3, and $R_1$ is hydrogen or an alkyl group, and $R_2$ is a tetravalent aromatic radical having 1 to 5 benzenoid-unsaturated rings of 6 carbon atoms, $R_3$ is a divalent aromatic radical having 1 to 5 benzenoid-unsaturated rings of 6 carbon atoms, in a solvent containing a complexing agent (C), which is complexed with the admixture by hydrogen bonding, to form a solution having a solid content of at least 20% by weight, based on the total weight of the solution;

(b) condensing the solution by heating to effect a condensed solution having a solid content of up to about 85% by weight, based on the total weight of the condensed solution;

(c) cooling the condensed solution to effect solidification thereof;

(d) crushing the solidified condensed solution; and (e) heating the crushed solidified condensed solution at a temperature between about 70° C. and about 140° C. to form a polyimide precursor solid residuum of an apparent density from about 1 to about 40 pounds/ft$^3$ and a residual content of complexing agent (C) between about 1 and 15% by weight, based on the total weight of the polyimide precursor solid residuum.

11. The process of claim 10, wherein the complexing agent (C) is an ether.

12. The process of claim 11, wherein the ether is selected from the group consisting of tetrahydrofuran, glyme, diglyme, dioxane, 2-methoxy ethanol and 2-ethoxy ethanol.

13. A polyimide precursor solid residuum according to claim 3, which is in the form of a member selected from the group consisting of powder, friable balloons, and flake.

14. A polyimide precursor solid residuum according to claim 13, which is in the form of friable ballons and has a density of from about 1 to about 10 pounds/ft$^3$.

* * * * *